INVENTOR.
Philip Richards
BY
ATTORNEYS

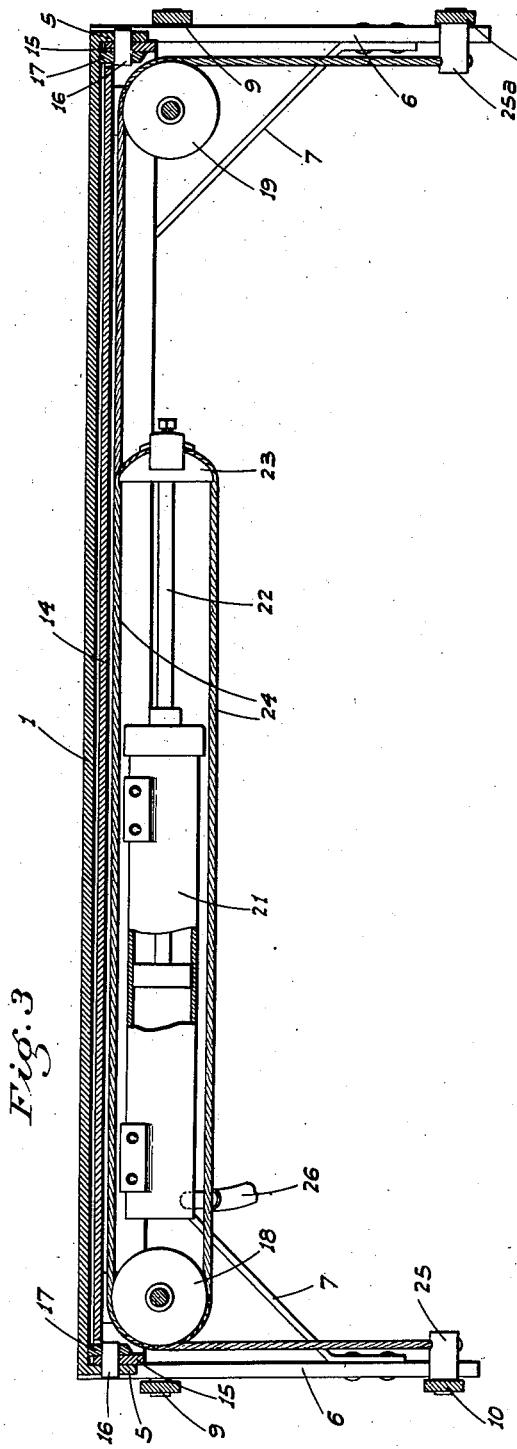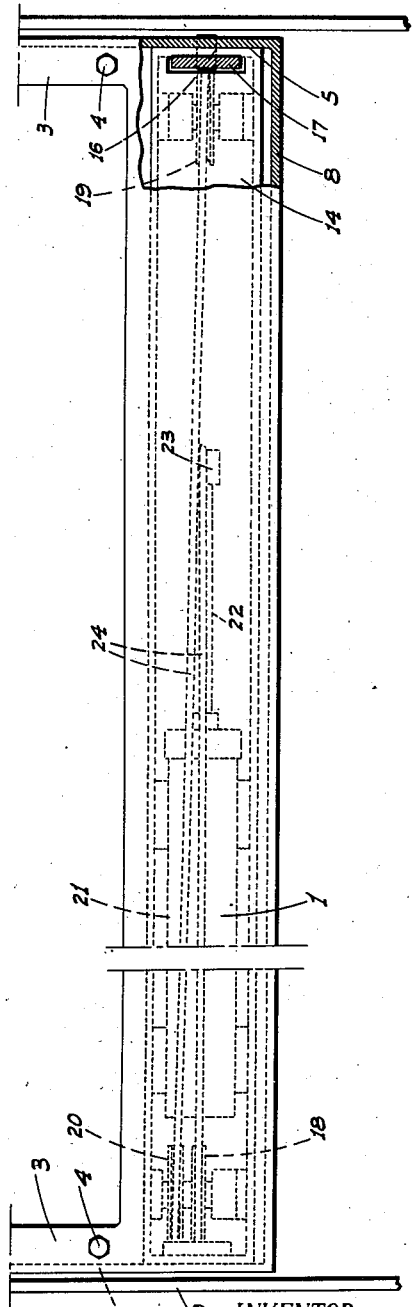

Patented Oct. 6, 1942

2,298,166

UNITED STATES PATENT OFFICE 2,298,166

POWER TAILGATE

Philip Richards, Fresno, Calif.

Application May 10, 1941, Serial No. 392,919

8 Claims. (Cl. 214—75)

This invention relates to power operated tailgates for trucks and the like, and by means of which loads need only to be manually lifted a few inches from the ground, being then elevated by power to the leveling of the truck bed.

The principal objects of my invention are to provide a device for the purpose which is extremely substantial and compact; which may be completely assembled at the factory and then easily and quickly mounted on the truck as a unit ready for operation without any alterations to or work being done on the bed; which actually increases the load carrying area of the bed itself, and in which the operating mechanism for the tailgate is concealed and protected from contact with the loads being handled.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a transverse section taken on the line 3 of Fig. 1 but with the operating mechanism in the position occupied when the tailgate is partly raised.

Figure 4 is a fragmentary top plan view of the structure.

Figure 1:
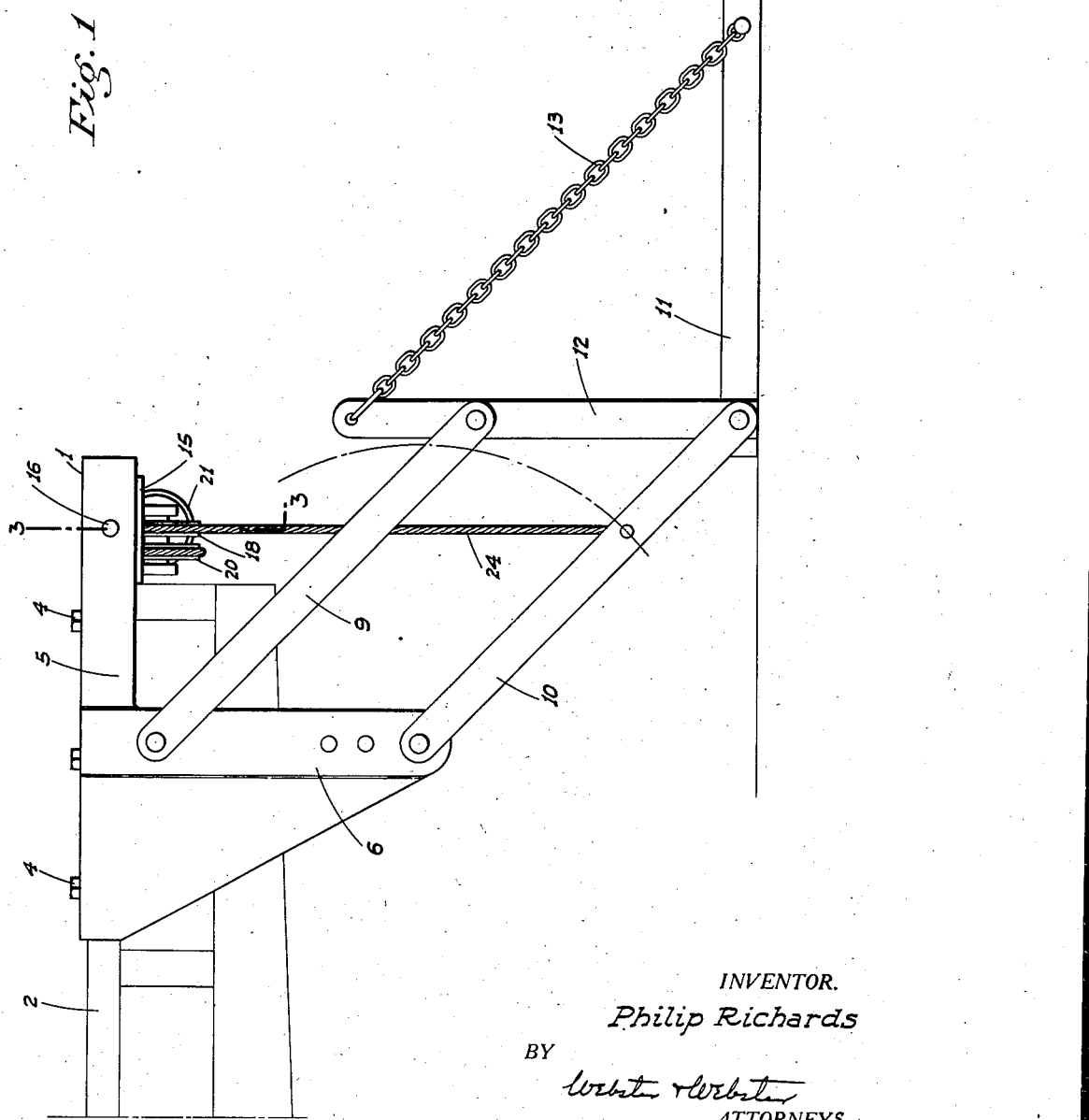
Figure 1 is a side elevation of the device showing the tailgate lowered.

Referring now more particularly to the characters of reference on the drawings, the frame of the structure when made as an attachment, comprises a narrow platform or plate 1 adapted to extend rearwardly from and substantially on a level with the bed 2 of the truck for its full width. Top flanges 3 extend forwardly from the platform at its sides and overlie the bed, to which they are rigidly secured by suitable means such as bolts 4.

Depending side flanges 5 extend the full length of the platform and flanges 3, the forward portions of said flanges being formed as relatively deep brackets 6 which are braced from the bed of the truck by suitable diagonals 7. A depending flange 8 also extends along the back edge of the platform for its full extent. It will thus be seen that I have provided a rigid unitary supporting framework for the tailgate which may be readily mounted on the truck bed without altering the latter, and which increases the load supporting area of the bed by the width of the platform.

Pivotally mounted on and projecting rearwardly from each bracket 6 are upper and lower parallel links 9 and 10 respectively. The lower link is pivoted at its rear end on the tailgate 11 adjacent its forward end and while the upper link is pivoted on an arm 12 upstanding from the tailgate and pivoted thereon in common with the link 10. A chain 13 or the like connects the arm and tailgate near the rear end of the latter and maintains the tailgate horizontal while allowing the same to fold up relative to the arm. It will be seen however that except for this folding the tailgate and arm 12 in effect form a rigid unit.

Figure 2:
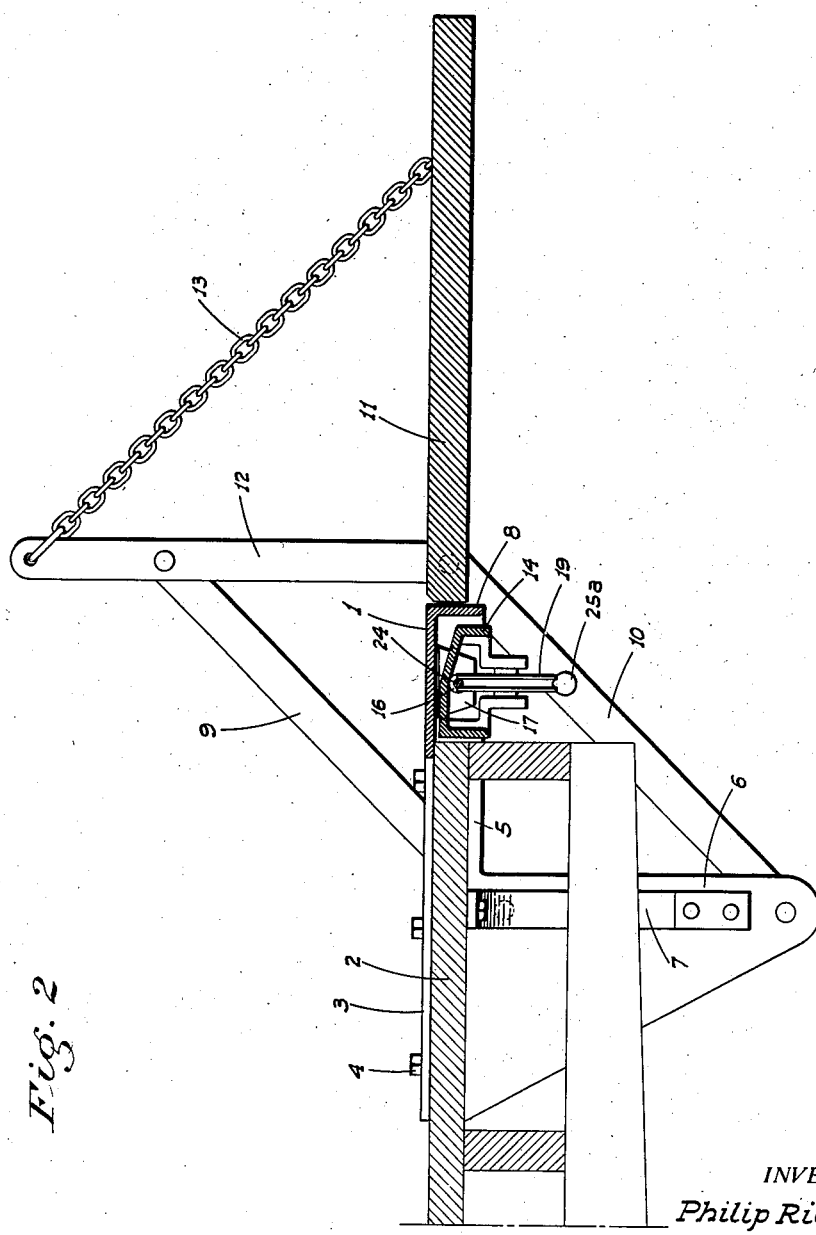
Figure 2 is a sectional elevation showing the tailgate raised.

The length of the links relative to the height of the truck from the ground is such that the tailgate will rest on the ground when the links depend at an angle of substantially 45° as shown in Fig. 1, and in which position the front edge of the tailgate is at least not ahead of the rear edge of the platform 1. The rear end of the platform is at such a distance from the pivotal connection of the links with the brackets 6 that when the links are raised so as to be substantially 45° above horizontal, the tailgate will lie flush with and immediately adjacent the platform as shown in Fig. 2.

To control the vertical movement of the tailgate, the following operating mechanism is provided.

Disposed under the platform is an auxiliary frame 14 preferably of inverted channel form, and having depending end flanges 15 which are swung from the flanges 5 by alined centrally disposed trunnions 16. The trunnions also engage brackets 17 depending from the platform into the channel 14 laterally inward from the flanges 15 to provide a two-point support for the trunnions as shown in Fig. 3. Supported from the frame 14 adjacent its ends are pulleys 18 and 19, disposed with their axes extending lengthwise of the truck and in the vertical transverse plane of the trunnions, so that the center of a cable passing about the top of the pulleys will aline with the axis of the trunnions. Another pulley 20 is mounted in common with and alongside pulley 18.

Between the pulleys 18 and 19 a hydraulic cylinder 21 is rigidly mounted in and extends lengthwise of frame 14, the diameter of this cylinder being such that it will clear the runs of a cable passing between the pulleys. A piston rod 22 projects from the end of the cylinder facing the pulley 19 and has a cable engaging head 23 thereon which is the same depth as the diameter of the pulleys. A cable 24 is anchored intermediate its ends on the head. One portion of this cable extends thence back over the cylinder and about the pulley 18 from above to a connection with a suitable anchor block 25 on the adjacent link 10. The other portion of the cable extends from the head 23 back and under the cylinder, up and over the pulley 20 from below, thence to up and about the pulley 19 and down to another anchor block 25a on the adjacent link 10. The necessary adjustment of the cable to assure an even pull on both depending portions may be made at the head 23 or at the link anchor blocks, as may be desired or most convenient.

A single flexible fluid supply and exhaust conduit 26 connects with the cylinder at its ends opposite that from which the piston rod projects, since it is only necessary to apply force to lift the tailgate. The latter drops of its own weight when the fluid is released and, by reason of the cable connections, causes retraction of the piston rod in the cylinder at the same time. The fluid is maintained under pressure and controlled by conventional means, such as is commonly used in operating hydraulic control unit and forms no part of this invention.

The purpose of swinging the frame 14 in the particular manner as above described is to enable the pulleys to remain in properly engaging relation with the depending cable portions at all times and irrespective of the change of alinement of the cables relative to a vertical plane which is had due to the arc through which the anchors 25 and 25a move, as indicated in Fig. 1. The cable portions are connected to the links 10 nearer to the rear end thereof than to their forward end. This gives a very advantageous leverage which avoids the need of a multiple-sheave cable arrangement and enables a relative small power cylinder to be used.

The operating cylinder, pulleys, and so forth being mounted directly under the platform 1, which extends rearwardly of and clear of the truck bed, there is no interference of any kind with the latter, and the entire structure may thus be assembled at the factory and applied to the truck with a minimum of time and labor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A truck tailgate attachment comprising vertical side brackets, means to mount the brackets on a truck in depending relation to the bed thereof, upper and lower parallel links pivoted on and projecting rearwardly from the brackets, a horizontal tailgate unit on which the links are pivoted at their rear end, means connected to a link on each side to control the swinging of the same to raise and lower the tailgate and a transverse platform rigid with and connecting the brackets at their upper end and forming a rearward extension of the truck bed from side to side thereof.

2. A truck tailgate attachment comprising vertical side brackets, means to mount the brackets on a truck in depending relation to the bed thereof, upper and lower parallel links pivoted on and projecting rearwardly from the brackets, a horizontal tailgate unit on which the links are pivoted at their rear end, a platform rigid with and connecting the brackets at the top and forming a rearward extension of the truck bed and means to control the raising and lowering the tailgate supported from and under the platform and including depending elements connected to links on opposite sides of the tailgate.

3. A truck tailgate structure comprising vertical side brackets, means to mount the brackets on a truck in depending relation to the bed thereof, a transverse platform rigid with and connecting the brackets at the top and forming a rearward extension of the truck bed, a horizontal tailgate disposed rearwardly of the platform, means mounting the tailgate on the brackets for vertical movement of the tailgate while maintaining the same horizontal and including links connecting the brackets and tailgate, pulleys supported from and under the platform adjacent its ends, cable portions connected to and upstanding from the links and passing over the pulleys and means mounted on and supported from and under the platform and connected to the cable portions to pull on both simultaneously and to the same extent.

4. A truck tailgate structure comprising vertical side brackets, means to mount the brackets on a truck in depending relation to the bed thereof, a horizontal tailgate disposed rearwardly of the brackets, means mounting the tailgate in connection with the brackets for vertical movement of the tailgate and including links connecting the brackets and tailgate, pulleys mounted above the links in a plane intermediate their ends, cable portions connected to and upstanding from the links and passing over the pulleys, means connected to said portions beyond the pulleys to pull on both simultaneously and to the same extent.

5. A truck tailgate structure comprising vertical side brackets, means to mount the brackets on a truck in depending relation to the bed thereof, a horizontal tailgate disposed rearwardly of the brackets, means mounting the tailgate in connection with the brackets for vertical movement of the tailgate and including links connecting the brackets and tailgate, pulleys mounted above the links in a plane intermediate their ends, cable portions connected to and upstanding from the links and passing over the pulleys, the latter being disposed with their axes extending lengthwise of the truck, pull means connected to the cable portions between the pulleys, and means supporting the pull means and pulleys as a unit from the brackets.

6. A truck tailgate structure comprising vertical side brackets, means to mount the brackets on a truck in depending relation to the bed thereof, a horizontal tailgate disposed rearwardly of the brackets, means mounting the tailgate in connection with the brackets for vertical movement of the tailgate and including links connecting the brackets and tailgate, pulleys mounted above the links in a plane intermediate their ends, cable portions connected to and upstanding from the links and passing over the pulleys, the latter being disposed with their axes extending lengthwise of the truck, pull means connected to the cable portions between the pulleys, an auxiliary transverse frame in which the pulleys and pull means are mounted, and means pivoting the frame in connection with the brackets in a horizontal plane substantially tangent to the top of the pulleys.

7. A truck tailgate structure comprising vertical side brackets, means to mount the brackets on a truck in depending relation to the bed thereof, a horizontal tailgate disposed rearwardly of the brackets, means mounting the tailgate in connection with the brackets for vertical movement of the tailgate and including links connecting the brackets and tailgate, pulleys mounted above the links in a plane intermediate their ends, cable portions connected to and upstanding from the links and passing over the pulleys, the latter being disposed with their axes extending lengthwise of the truck, pull means connected to the cable portions between the pulleys, a member in which the pulleys are mounted, and means pivoting the member in connection with the brackets on a horizontal transverse line substantially tangent to the top of the pulleys.

8. A truck tailgate structure comprising vertical side brackets, means to mount the brackets on a truck in depending relation to the bed thereof, a horizontal tailgate disposed rearwardly of the brackets, means mounting the tailgate in connection with the brackets for vertical movement of the tailgate and including links connecting the brackets and tailgate, pulleys mounted above the links in a plane intermediate their ends, the pulleys being disposed with their axes extending lengthwise of the truck, another pulley disposed adjacent and offset horizontally from one of said first named pulleys, a fixed power cylinder disposed between the first named cylinder, a piston rod projecting from one end of the cylinder in a direction away from said other pulley, a head on the outer end of the rod, and a cable secured intermediate its ends on said head; one portion of the cable extending from the head over and along the cylinder to and about said one of the first named pulleys and then down to a connection with the adjacent link and the other portion of the cable extending from the head under and along the cylinder to and about said other pulley from below, then across and over the other one of the first named pulleys and depending thence to a connection with the adjacent link.

PHILIP RICHARDS.